No. 836,874. PATENTED NOV. 27, 1906.
N. B. FEATHER.
TESTING DEVICE FOR PLUMBERS, &c.
APPLICATION FILED MAR. 21, 1906.
4 SHEETS—SHEET 1.
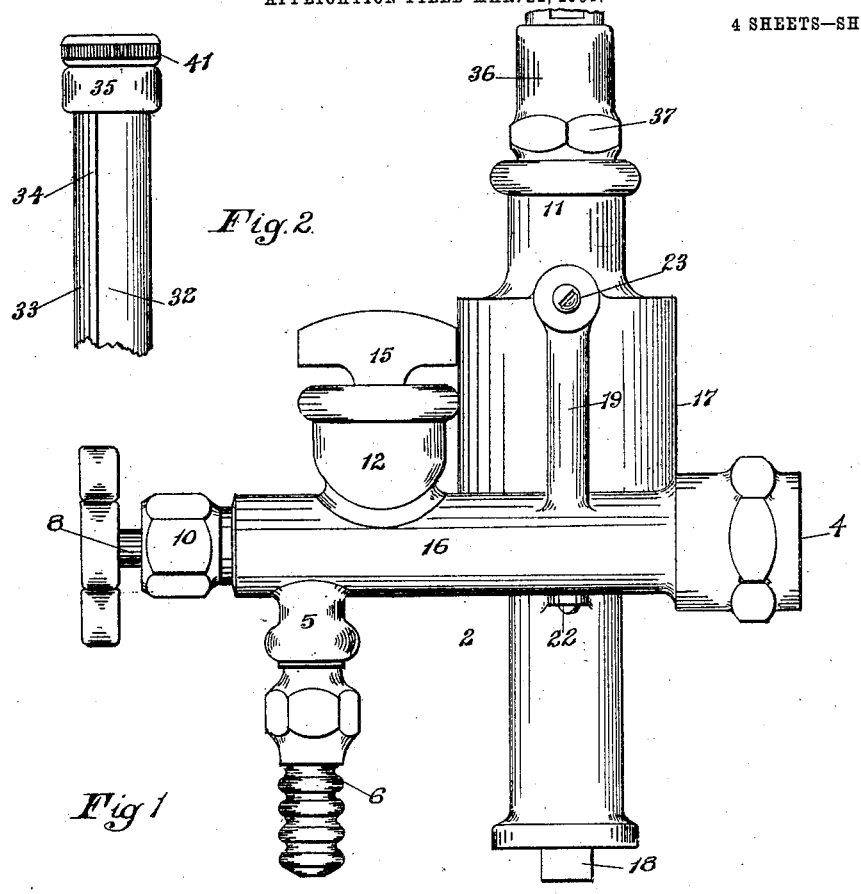
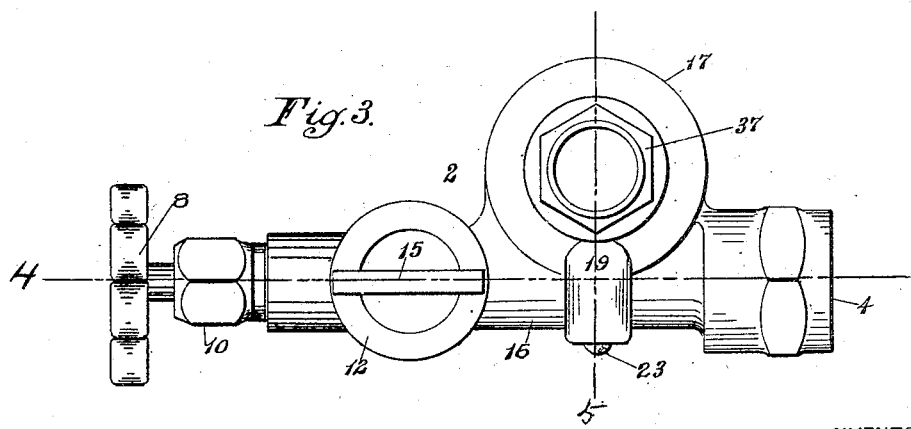
WITNESSES
Frederick Germann Jr.
Ethel B. Reed
INVENTOR
Nicholas B. Feather,
BY
Russell M. Everett
ATTORNEY No. 836,874. PATENTED NOV. 27, 1906.
N. B. FEATHER.
TESTING DEVICE FOR PLUMBERS, &c.
APPLICATION FILED MAR. 21, 1906.
4 SHEETS—SHEET 2.
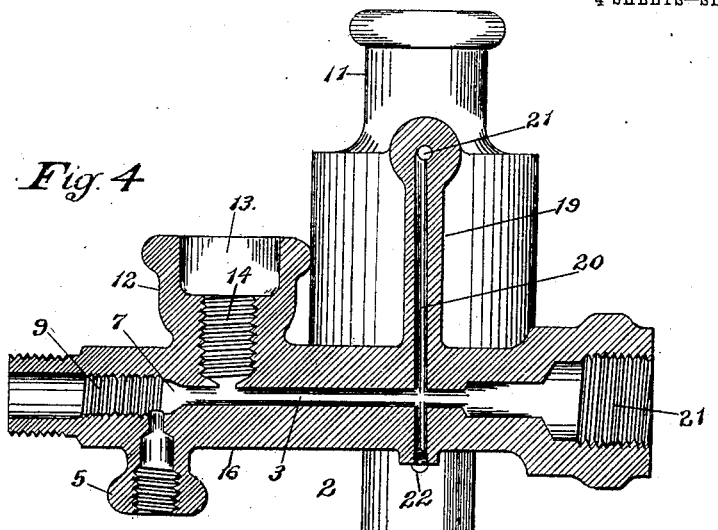
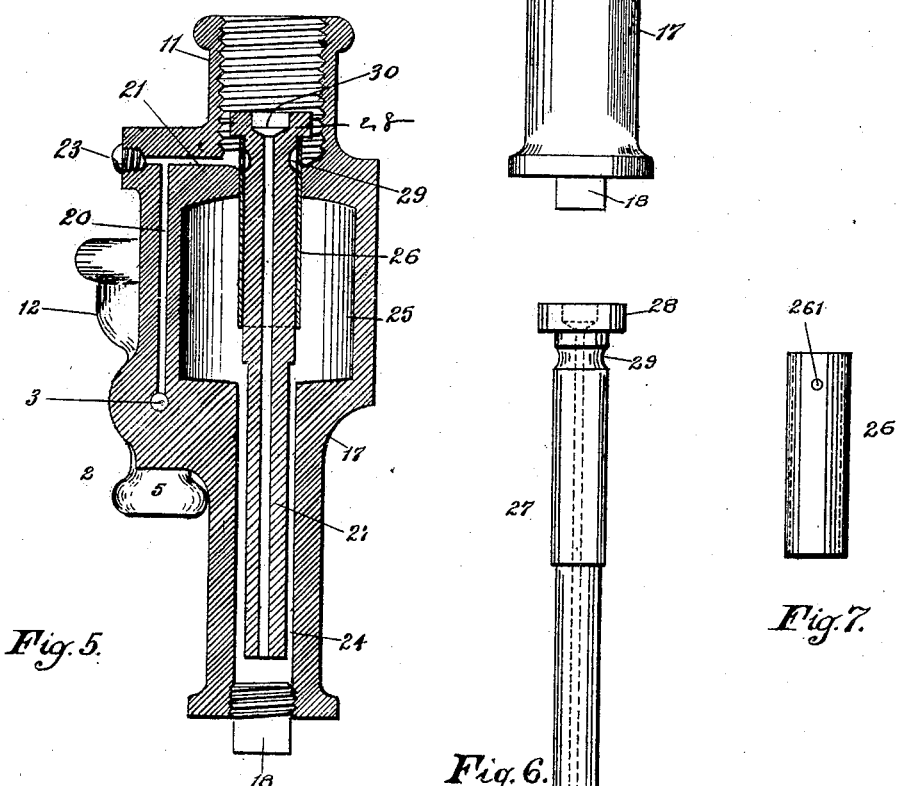
WITNESSES
INVENTOR
BY
ATTORNEY No. 836,874. PATENTED NOV. 27, 1906.
N. B. FEATHER.
TESTING DEVICE FOR PLUMBERS, &c.
APPLICATION FILED MAR. 21, 1906.
4 SHEETS—SHEET 3.
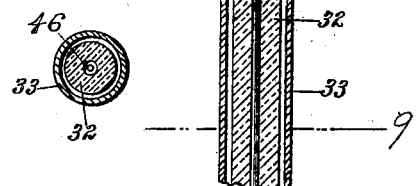
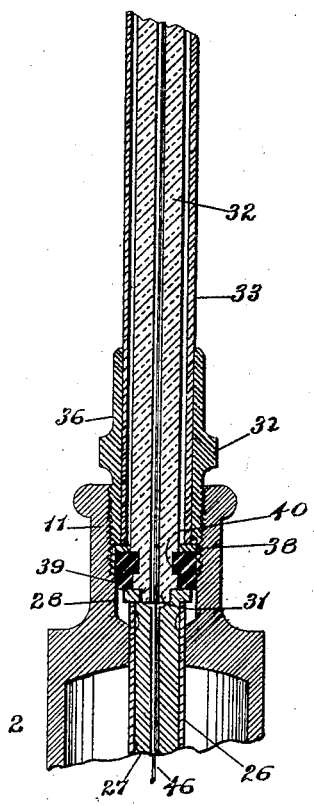
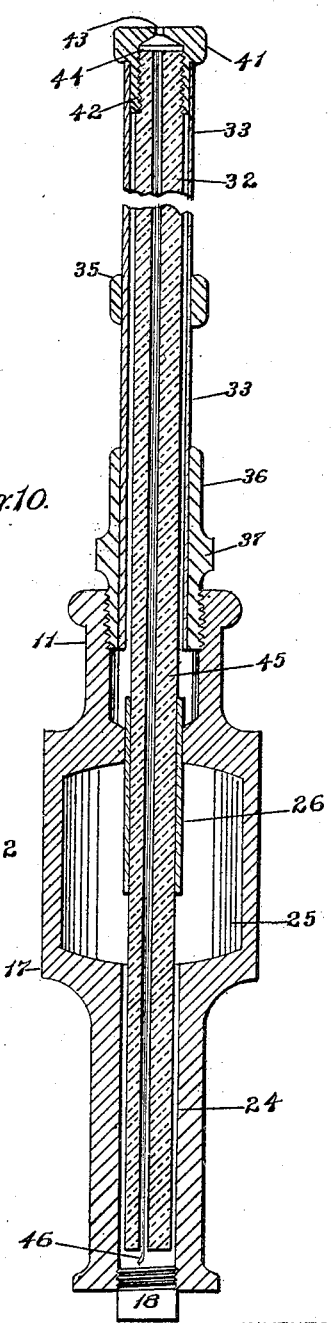
WITNESSES
INVENTOR
Nicholas B Feather,
BY
Russell M. Everett
ATTORNEY
THE NORRIS PETERS CO., WASHINGTON, D. C.

No. 836,874. PATENTED NOV. 27, 1906.
N. B. FEATHER.
TESTING DEVICE FOR PLUMBERS, &c.
APPLICATION FILED MAR. 21, 1906.

4 SHEETS—SHEET 4.

WITNESSES
Frederick Germann
Ethel B. Reed

INVENTOR
Nicholas B. Feather
BY
Russell M. Everett
ATTORNEY

UNITED STATES PATENT OFFICE.

NICHOLAS B. FEATHER, OF NEWARK, NEW JERSEY.

TESTING DEVICE FOR PLUMBERS, &c.

No. 836,874.          Specification of Letters Patent.          Patented Nov. 27, 1906.

Application filed March 21, 1906. Serial No. 307,201.

*To all whom it may concern:*

Be it known that I, NICHOLAS B. FEATHER, a subject of the King of Great Britain, and a resident of Newark, in the county of Essex and State of New Jersey, have invented certain new and useful Improvements in Testing Devices for Plumbers, &c., of which the following is a specification.

This invention relates to devices adapted to be used by gas-fitters, plumbers, &c., for testing the piping of houses and the like for leaks and for discovering the location of said leaks, such devices being commonly known as "mercury-columns."

The objects of the invention are to secure a construction in which the mercury cannot escape and be lost, to prevent the access of ether used for discovering leaks to the mercury-chamber, to enable a celluloid tube to be used instead of glass, to secure a free flow of mercury in said tube, to provide a simple and inexpensive construction, and to obtain other advantages and results as may be brought out in the following description.

The invention consists in the improved testing device for plumbers, substantially as hereinafter described and claimed.

Figure 12:
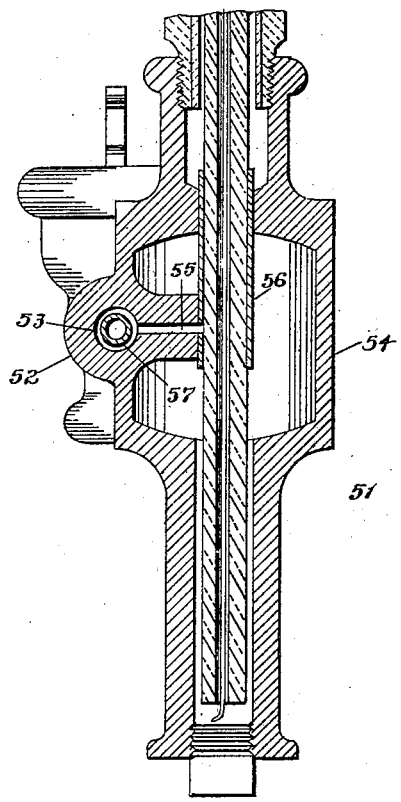
Figure 11:
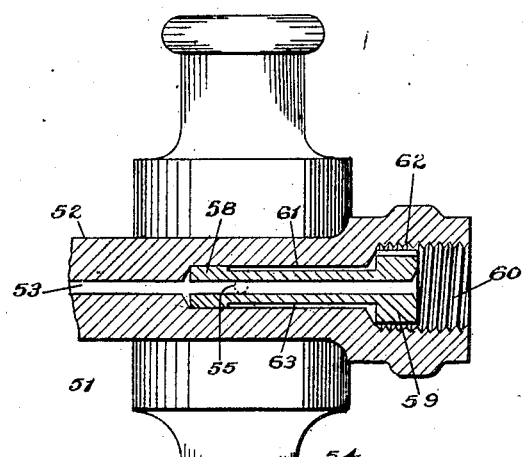
Figure 13:
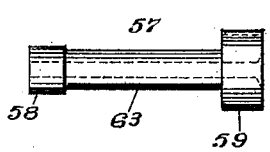
Figure 14:
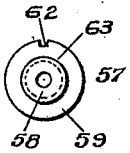

Referring to the accompanying drawings, in which like numerals of reference indicate corresponding parts in each of the several figures, Figure 1 is a rear elevation of my improved device with the mercury-tube broken away, and Fig. 2 shows the upper end of said tube. Fig. 3 is a plan of the device. Figs. 4 and 5 are vertical sections taken on lines 4 and 5, respectively, of Fig. 3. Figs. 6 and 7 are detail views of a certain base-tube and inner sleeve, respectively. Fig. 8 is a central sectional view of the mercury-column with base-tube; and Fig. 9 is a cross-section of the same on line 9, Fig. 8. Fig. 10 is a central section of the mercury-column without the employment of the base-tube. Figs. 11 and 12 are sectional views corresponding to Figs. 4 and 5, respectively, and illustrating a modified form of construction; and Figs. 13 and 14 are details showing in side and end view, respectively, a certain guard-tube employed in said modified construction.

In said drawings, 2 indicates the body of my improved device in its preferred form, having a horizontal channel 3 and adapted to be connected at one end of said channel, as at 4, to the pipe or piping to be tested and which is not shown. Near the other end of said channel 3 the body 2 has a boss 5, receiving a nipple 6 for connecting the tube from an air pump or compressor, (not shown,) the bore of said nipple and boss leading into the said channel 3. At an inner point beyond the said boss 5 the channel 3 provides a seat 7, adapted to receive a needle-valve 8, screwing into the end of the body, as at 9, and which is thus adapted to control communication between the nipple 6 and channel 3. A packing 10 serves in any ordinary manner to prevent leakage around the valve-stem.

At the upper side of the channel and in beyond the valve-seat 7 is a cup-like extension 12, open at its outer flared end 13 to receive ether or the like, as hereinafter described, and being threaded at its throat 14 to receive a closing-plug 15.

Besides the portion 16 of the body-casting, which has the features just described, there is an integral upright portion 17, which is interiorly hollowed and has the mercury-column tube extending upward from its top, the bottom being closed by a screw-plug 18. At that side of the upright portion 17 where the horizontal portion 16 is located is a rib or protuberance 19, through which extend borings or passages 20 21, connecting the channel 3 with the upper part of the hollow body portion 17, the ends of the arms 20 21 of said passage being closed by screw-plugs 22 23 after boring.

Referring now to Fig. 5 more particularly, it will be seen that the chamber of the upright casting portion 17 comprises a lower reduced part 24 and an upper enlarged part 25, the throat of the chamber being contracted above said enlarged part 25 and at the point where the passage 21 enters. A tube or sleeve 26 is then fitted tightly in said throat with a lateral aperture 26', which coincides with the opening of the passage 21, the said sleeve terminating short of the lower end of the enlarged portion 25 of the chamber. The lower reduced part 24 of the chamber provides a well for mercury, and if the device be tipped said mercury runs into the sides of the enlarged portion 25 around the sleeve 26 without escaping. Within the said sleeve 26 is a base-tube 27, of iron, and which is adapted to dip at its lower end into the mercury-well 24. The top of said base-tube has an outer flange 28, adapted to rest upon the top of the sleeve, and opposite the passage 21 the tube has an exterior annular groove 29, the rest of said tube fitting the sleeve tightly enough to prevent the up passage of mercury, but loosely enough to allow air communication. The top of the said base-tube is countersunk, as at 30, to receive the lower reduced end 31 of an upper tube-section 32, which is preferably of celluloid and is shown more fully in Fig. 8. This tube extends upward a sufficient distance for the mercury to rise and is inclosed in a brass shield 33, having an observation-slot 34 at one side and a slidable marking-ring 35 on its exterior. Said shield 33 at its bottom is reinforced by a collar 36, threaded at its lower end to screw into the top 11 of the mercury-reservoir and having an upper wrench-receiving portion 37. This collar is fast on the shield 33, and beneath the same is a brass washer 38, Fig. 8, and then a rubber gasket 39 around the tube 32 between the washer and the flange 28 of the base-tube 27, whereby when the shield is screwed into place by means of its said collar the rubber gasket forms a tight joint between the tube-sections and between the tube and the mercury-chamber top 11. Preferably a portion of the gasket 39 projects into an annular recess 40 of the tube 32, so as to prevent the same from being pulled upward out of its place. Onto the top end of the mercury-tube 32 screws a cap 41, having a reduced lower portion 42 to enter the shield 33 and a perforation 43 in its top. A layer of felt 44 in the top of said cap then permits air to pass without danger of mercury escaping.

In operation the end 4 of the body portion having been connected to the piping to be tested air is pumped in through the nipple 6 until the mercury rises in the tube 32, and then the valve 8 is closed. If the column of mercury falls, the leak is detected by introducing ether through the cup 12 and again pumping up a pressure so that the escaping ether can be detected by its odor. The upwardly-extending passage 20 prevents any ether passing into the mercury-chamber, and the iron base-tube 27 further insures no action of ether or ether fumes upon the celluloid tube 32.

In case the device is to be employed only for testing and no ether used or in case a glass tube is employed a single tube 45, as shown in Fig. 10, may replace the base-tube 27 and top section 32, if desired.

A fine wire 46 is preferably placed in the tubular duct for the mercury to rise in, as shown, and which facilitates an even flow of mercury without breaking into detached sections.

Under some conditions a body portion 51 of the form shown in Figs. 11 and 12 may be employed where the horizontal portion 52, having the channel 53, is disposed sufficiently high upon the upright part 54 so that a passage 55 opens straight in from said channel to the sleeve 56. In this case an ether-tube 57 is employed to prevent ether from going into the mercury-chamber, comprising a short tube with outwardly-enlarged ends 58 59 arranged in the channel 53 adjacent to the end 60, to be attached to the pipes to be tested. The larger one, 59, of said enlarged ends lies in the said end 60, and the other end 58 fits an enlarged portion 61 of the channel on the opposite side of the passage 55. The ether then flows through the central bore of the tube, while the air passes through a slot 62 at the upper edge of the larger end 59 of the ether-tube, and so along the reduced middle portion 63 thereof to the passage 55.

Obviously various detail modifications and changes could be made from the constructions specifically shown and described without departing from the spirit and scope of the invention, and I do not wish to be understood as limiting myself by any positive descriptive terms herein employed except as the state of the art may require.

Having thus described the invention, what I claim as new is—

1. In a device of the character described, a body providing a mercury-chamber, a mercury-tube extending upward from said chamber, the throat of the chamber being closed around said tube, and a sleeve depending from said throat around the tube, said body having a channel adapted to be connected to the pipes to be tested and a duct leading from said channel to the said sleeve.

2. In a device of the character described, a body providing a mercury-chamber, a mercury-tube extending into said chamber with the throat of the chamber closed around said tube, and a sleeve depending from said throat around the tube, said body having a channel adapted to be connected to the pipes to be tested and a duct leading from said channel and opening through the side of said sleeve against the mercury-tube.

3. In a device of the character described, a body providing an upright portion with an interior mercury-well and an upper enlarged chamber, a mercury-tube extending upward from said well, the throat of the chamber being closed around said tube, and a sleeve depending from said throat around the tube, said body having another portion with a channel adapted to be connected to the pipes to be tested and a duct leading from said channel to the sleeve in said mercury-chamber.

4. In a device of the character described, a body providing an upright portion with an interior mercury-well and an upper enlarged chamber, a sleeve fitted at its upper end into the throat of said chamber and depending thereinto, a base-tube within said sleeve extending into the mercury-well and having a flanged top engaging the upper end of the sleeve, and an upper tube fitted to said base-tube, said body having a channel adapted to be placed in communication with pipes to be tested and connected by a passage with the upper part of said sleeve.

5. In a device of the character described, a body providing an upright portion with an interior mercury-well and an upper enlarged chamber, a sleeve fitted at its upper end into the throat of said chamber and depending thereinto, a base-tube within said sleeve extending into the mercury-well and having a flanged top engaging the upper end of the sleeve, an upper tube fitted to said base-tube, an elastic gasket surrounding said upper tube adjacent to said flanged top of the base-tube, and a shield inclosing the upper tube and adapted to screw into the top of said body to compress the said gasket, the body having a channel adapted to be placed in communication with pipes to be tested and connected by a passage with the upper part of said sleeve.

6. In a device of the character described, a body providing an upright portion with an interior mercury-well and an upper enlarged chamber, a sleeve fitted at its upper end into the throat of said chamber and depending thereinto, a base-tube within said sleeve extending into the mercury-well and having a flanged top engaging the upper end of the sleeve, an upper tube fitted to said base-tube and having an annular exterior groove adjacent to its lower end, an elastic washer surrounding said upper tube with a portion entering said groove and being adapted to engage the flanged end of the base-tube, and a shield inclosing the upper tube and adapted to screw into the top of said body to compress the said gasket, the body having a channel adapted to be placed in communication with pipes to be tested and connected by a passage with the upper part of said sleeve.

7. In a device of the character described, the combination with a body providing a mercury-well, and a non-metallic mercury-tube projecting upward therefrom with a bore of substantially uniform diameter, of a metal wire also of substantially uniform diameter inserted in the bore of said tube, said wire extending for that portion of the tube traversed by the rising and falling surface of the mercury and being sufficiently smaller than said bore to provide an open flow-space between itself and the walls thereof, the cross-sectional area of said flow-passage being substantially uniform.

8. In a device of the character described, a body providing an upright portion with an interior mercury-well and an upper enlarged chamber, a sleeve fitted at its upper end into the throat of said chamber and depending thereinto, a base-tube within said sleeve extending into the mercury-well and having a flanged top engaging the top of said sleeve and an annular exterior groove below said flanged top, and an upper tube, the body having a passage opening through said sleeve into said groove of the base-tube.

9. A device of the character described, having a body providing an upright mercury-chamber and a channel adapted to be connected at one end to a pipe system and at the other end to a pump and intermediate of said ends having an ether-inlet and communicating with the top of the mercury-chamber by a passage opening into the throat thereof, a sleeve seated in said throat of the mercury-chamber with a lateral aperture coinciding with the end of said passage and projecting downward into the chamber, a base-tube in said sleeve permitting the passage of air between itself and the sleeve and reaching to the lower part of the mercury-chamber, an upper tube connecting with the top of said base-tube and having an annular recess near its lower end, an elastic gasket in said recess, and an annular nut around said upper tube adapted to screw into the top of the body portion and engage said gasket.

10. In a device of the character described, a body having an upright portion providing a mercury-chamber and a transverse portion providing a channel adapted to be connected to a pipe system and to a pump, said upright and transverse portions being connected with the said channel of the latter lying at one side of the chamber of the former and projecting at both ends beyond the same, the said connection of the upright and transverse portions providing communication between the chamber and channel of said parts, and a mercury-tube extending upward from said chamber.

11. In a device of the character described, a body having an upright portion providing a mercury-chamber and a transverse portion at one side of said mercury-chamber providing a channel adapted to be connected to a pipe system and to a pump, said upright and transverse portions being integrally united with the ends of each projecting on opposite sides of the other and providing at such union a passage connecting said channel with the mercury-chamber, and a mercury-tube extending upward from said chamber.

12. In a device of the character described, a body having an upright portion providing a lower mercury-well and a radially-enlarged chamber at the top of said well, a mercury-tube extending downward through said chamber into the well, said body having an inner part of said upright portion extending close to said mercury-tube and having another portion providing a channel adapted to be connected to a pipe system and to a pump, and a duct leading from said channel through said part of the upright portion extending close to the mercury-tube and opening thereagainst.

13. In a device of the character described, a body having an upright portion providing a mercury-chamber, and a transverse portion united to one side of said body portion and providing a channel in communication with said mercury-chamber and adapted to be connected on opposite sides of the upright portion to a pipe system and to a pump, said upright and transverse portions being united above the bottom of the upright portion, leaving said bottom freely exposed, and the transverse portion extending at both its ends past the upright portion to project therefrom, and a mercury-tube extending upward from said chamber.

14. In a device of the character described, a body having an upright portion providing a chamber, a mercury-tube depending into said chamber through an air-tight closure, an annular member surrounding said tube in the upper part of said chamber, the said body having another portion providing a channel adapted to be connected to a pipe system and to a pump and a duct leading from said channel and opening through said annular member against the mercury-tube.

15. In a device of the character described, a body providing an upright portion having a chamber, a mercury-tube depending into said chamber through an air-tight closure, and a member inclosing said tube adjacent to said closure, the said body having another portion providing a channel adapted to be connected to a pipe system and to a pump, and a duct leading from said channel and opening through said member against the mercury-tube.

16. In a device of the character described, a body having a substantially cylindrical upright portion providing an interior mercury-chamber, a transverse cylindrical portion arranged tangentially at one side of said upright portion and connected thereto at a point intermediate of its own ends, said transverse portion having a longitudinal channel adapted to be connected to a pipe system and to a pump and the two portions having at their union a passage connecting said channel and mercury-chamber, and a mercury-tube extending into said mercury-chamber.

17. In a device of the character described, a body having an upright portion providing a mercury-chamber, and transverse portion arranged tangentially at one side of said upright portion in connection therewith at a point above the bottom thereof and extending at its opposite ends past the said upright portion, said transverse portion providing a longitudinal channel and the two portions having at their union a passage connecting said channel and mercury-chamber, pipe-coupling means at one end of said transverse portion and at the other end a valve, an upper inlet on the transverse portion adjacent to said valve and a lower nozzle or tube connection, and a mercury-tube extending upward from the mercury-chamber.

NICHOLAS B. FEATHER.

Witnesses:
  RUSSELL M. EVERETT,
  ETHEL B. REED.